United States Patent
Funakoshi et al.

(10) Patent No.: US 6,306,363 B1
(45) Date of Patent: *Oct. 23, 2001

(54) FINE LOW SILICA FAUJASITE TYPE ZEOLITE AND PROCESS FOR ITS PRODUCTION

(75) Inventors: Hajime Funakoshi; Yoshinori Shirakura, both of Shinnanyo (JP)

(73) Assignee: Tosoh Corporation, Yamaguchi-Ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/320,830

(22) Filed: May 26, 1999

(30) Foreign Application Priority Data

May 29, 1998 (JP) .................................................. 10-164374
May 29, 1998 (JP) .................................................. 10-164375

(51) Int. Cl.[7] .................................................. C01B 39/22
(52) U.S. Cl. .......................... 423/710; 423/711; 423/716; 423/DIG. 21; 502/79
(58) Field of Search .................................. 423/709, 710, 423/711, DIG. 21, 716; 502/79

(56) References Cited

U.S. PATENT DOCUMENTS

| | | | |
|---|---|---|---|
| 2,882,244 | * | 4/1959 | Milton .......................... 423/DIG. 21 |
| 3,516,786 | * | 6/1970 | Maher et al. .................. 423/DIG. 21 |
| 3,808,326 | | 4/1974 | McDaniel et al. . |
| 4,576,986 | * | 3/1986 | Kostinko . |
| 4,608,236 | * | 8/1986 | Strack et al. .................... 423/710 |
| 5,154,904 | * | 10/1992 | Kleinschmit et al. ............ 423/710 |
| 5,183,650 | * | 2/1993 | Goto et al. ...................... 423/710 |
| 5,487,882 | * | 1/1996 | Hu et al. .......................... 423/700 |
| 5,645,811 | * | 7/1997 | Kuhm et al. .................... 423/711 |
| 5,993,773 | * | 11/1999 | Funakoshi et al. .............. 423/709 |

FOREIGN PATENT DOCUMENTS

| | | |
|---|---|---|
| 24 47 206 A | 4/1976 | (DE) . |
| 43 09 656 A | 9/1994 | (DE) . |
| 0 171 204 A | 2/1986 | (EP) . |
| 0 196 078 A | 10/1986 | (EP) . |
| 1223592 * | 2/1971 | (GB) . |

OTHER PUBLICATIONS

Patent Abstracts of Japan vol. 018, No. 625 (C–1279) 06–240082, Aug. 1994.

* cited by examiner

*Primary Examiner*—David R Sample
(74) *Attorney, Agent, or Firm*—Sughrue, Mion, Zinn, Macpeak & Seas, PLLC

(57) ABSTRACT

A fine low silica faujasite type zeolite of high purity, having a faujasite single phase as measured by X-ray diffractometry, wherein the $SiO_2/Al_2O_3$ molar ratio is from 1.9 to 2.1, the water adsorption in the form of Na-type is at least 35.0%, and the primary particle size is at least 0.05 μm and less than 1.0 μm. A process for producing the low silica faujasite type zeolite by mixing and gelling a solution containing an aluminate and a solution containing a silicate, followed by aging and crystallization, wherein after the gelling and/or at the initial stage of the aging, a solution having a set composition and preliminary aged at recited conditions is added in an amount of from 0.03 to 10% as $Al_2O_3$.

3 Claims, 2 Drawing Sheets

FINE LOW SILICA FAUJASITE TYPE ZEOLITE AND PROCESS FOR ITS PRODUCTION

The present invention relates to a fine low silica faujasite type zeolite of high purity having a $SiO_2/Al_2O_3$ molar ratio of from 1.9 to 2.1, which is excellent in gas adsorption performance, particularly nitrogen adsorption performance and which is used as a zeolite adsorbent separator for separating and concentrating oxygen from a gas mixture of oxygen and nitrogen by an adsorption method, and a process for its production.

With respect to a process for producing a low silica faujasite type zeolite having a $SiO_2/Al_2O_3$ molar ratio of from 1.9 to 2.1 (hereinafter referred to as "LSX"), various processes have been disclosed. For example, GB-1580928 discloses a process which comprises crystallizing a mixture comprising sodium, potassium, an aluminate and a silicate at a temperature of not higher than 50° C., or aging such a mixture at a temperature of not higher than 50° C. for a very long period of time of from 15 hours to 72 hours, followed by crystallization within a temperature range of from 60 to 100° C. but discloses nothing about a process for obtaining fine LSX in high purity.

ZEOLITES, vol 7, September p.451–457 (1987), discloses in detail the influence of the $SiO_2/Al_2O_3$ molar ratio, the K/(Na+K) molar ratio and the alkali concentration in the starting material, the aging conditions and the crystallization conditions over the formation of the low silica faujasite type zeolite, and the aging and the crystallization are carried out in a sealed plastic container. This reference discloses the effects of the molar ratio of K/(Na+K) over the particle size of LSX to be formed. It is disclosed that as the molar ratio of K/(NA+K) decreases, the particle size of LSX to be formed becomes small, and at a molar ratio of 0.20, LSX having a particle size of not larger than 2 $\mu$m will be formed. It is considered possible to prepare finer LSX by further lowering the molar ratio, but if the molar ratio is further lowered, A-type zeolite will be formed as a by-product, whereby it will be difficult to obtain fine LSX in high purity.

Further, U.S. Pat No. 4,859,217 discloses a process which comprises mixing and gelling a mixture containing sodium, potassium and an aluminate and a mixture containing a silicate at a low temperature of from 4 to 12° C., then aging this gel at a temperature of 36° C. for 48 hours and then raising the temperature to 70° C. for crystallization, wherein it is disclosed important to avoid generation of excessive mechanical energy and cooling in the final mixing, but nothing is disclosed about a method for obtaining fine LSX in high purity.

As described in the forgoing, according to the conventional techniques, it is extremely difficult to obtain a fine low silica faujasite type zeolite in high purity.

Further, it has been considered essential for the production of a low silica faujasite type zeolite to mix and gel a solution containing sodium, potassium, an aluminate and a silicate, at a low temperature, then age the gel in a stand still condition for a long period of time, and further raise the temperature to a crystallization temperature in a stand still condition, for crystallization. However, it is industrially disadvantageous to cool the starting material to a low temperature, and further, the gel has very poor heat conductivity, whereby in the production on a large scale, there has been a difficulty such that it takes a very long period of time to bring the temperature uniform in a stand still condition.

Under the above described circumstances, it is an object of the present invention to provide fine LSX in such a high purity that has not been known heretofore and to provide a process for producing fine LSX of high purity in a short period of time, particularly a process for producing fine LSX of high purity on a large scale in a short period of time.

The present inventors have conducted an extensive study on a process for producing fine LSX of high purity on a large scale continuously and constantly and as a result, have made the following discoveries, which have led to the present invention.

SUMMARY OF THE INVENTION

Namely, it has been found that fine LSX of high purity can be prepared by a process which comprises mixing and gelling a solution containing an aluminate and a solution containing a silicate, followed by aging and crystallization, wherein after the gelation and/or at the initial stage of the aging, a solution having a composition of 10–20 $Na_2O.Al_2O_3.5–20$ $SiO_2.100–250$ $H_2O$ and preliminarily aged at a temperature of from 10 to 60° C. for from 10 minutes to 3 hours, is added in an amount of from 0.03 to 10% as $Al_2O_3$ to the low silica faujasite type zeolite to be formed.

Further, it has been surprisingly found that by employing this process, highly pure LSX can be prepared in an extremely short period of aging time. The present invention has been accomplished on the basis of these discoveries.

Further, the $SiO_2/Al_2O_3$ molar ratio of the low silica faujasite type zeolite in the present invention, is theoretically 2.0, but it should be understood that when errors in measurement of the chemical composition, etc., are taken into consideration, a low silica faujasite type zeolite having a $SiO_2/Al_2O_3$ molar ratio of from 1.9 to 2.1 falls within the scope of the present invention.

Now, the present invention will be described in detail with reference to the preferred embodiments.

DETAILED DESCRIPTION

In the first aspect, the present invention provides a fine low silica faujasite type zeolite of high purity, having a faujasite single phase as measured by X-ray diffractometry, wherein the $SiO_2/Al_2O_3$ molar ratio is from 1.9 to 2.1, the water adsorption in the form of Na-type is at least 35.0%, and the primary particle size is at least 0.05 $\mu$m and less than 1.0 $\mu$m.

It is common to employ X-ray diffractometry to determine the purity of zeolite. Impurities formed during the preparation of LSX include, for example, A-type zeolite, sodalite, F-type zeolite disclosed on page 144 of Breck "Zeolite Molecular Sieves", Krieger 1974, and E-type zeolite disclosed at page 856. One of the characteristics of highly pure LSX of the present invention is that it has a faujasite single phase as measured by X-ray diffractometry, and it contains no such impurities.

However, in a case where crystallizability of impurities is poor, or a plurality of impurities are present in very small amounts, even if the purity is slightly low, no peaks of impurities will appear by X-ray diffractometry. Accordingly, a faujasite single phase as measured by X-ray diffractometry is merely one of the essential conditions for the purity being high.

On the other hand, the water adsorption of pure zeolite shows a constant value depending upon the type of zeolite and the type of its cations. For example, A-type zeolite of sodium form will adsorb 28 g of water per 100 g of zeolite, and F-type zeolite of sodium form will adsorb 27 g of water per 100 of zeolite. On the other hand, LSX of sodium form will adsorb 36 g of water per 100 g of zeolite and thus has a water adsorption higher than zeolites which are likely to be formed as impurities. Accordingly, on the basis of the water adsorption of synthesized LSX, the purity can be assumed. The highly pure LSX of the present invention has not only a faujasite single phase as measured by X-ray diffractometry, but also has a characteristic that the water adsorption in the form of Na form, shows a value of at least 35.0%, more preferably at least 35.5%.

Figure 1:
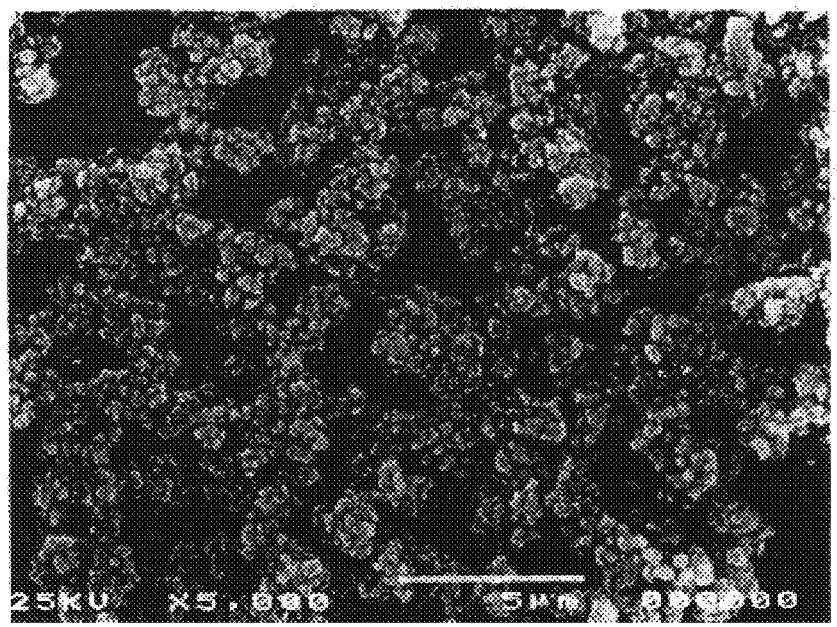
FIG. 1 is a photograph of the crystal structure of the powder obtained in Example 1, as observed by SEM under 5,000 magnifications.
Figure 2:
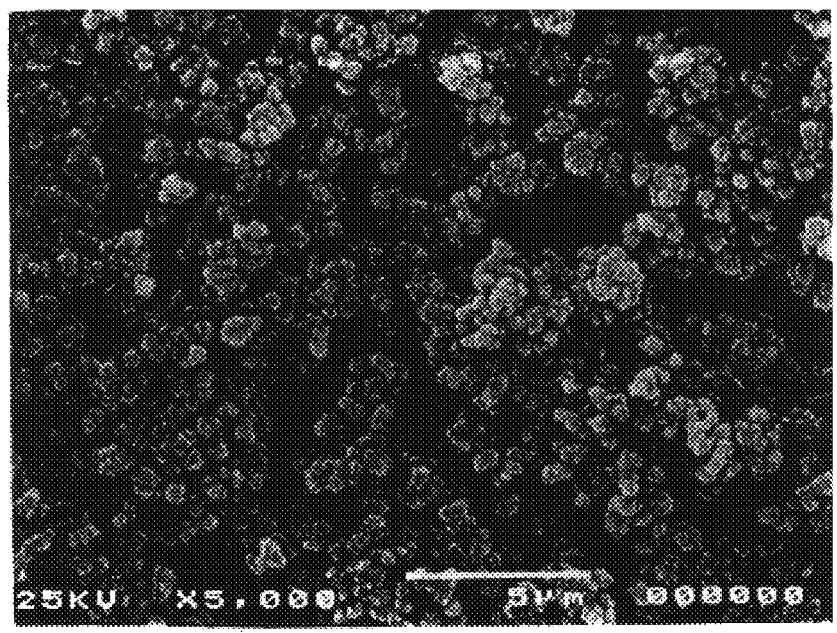
FIG. 2 is a photograph of the crystal structure of the powder obtained in Example 2, as observed by SEM under 5,000 magnifications.
Figure 3:
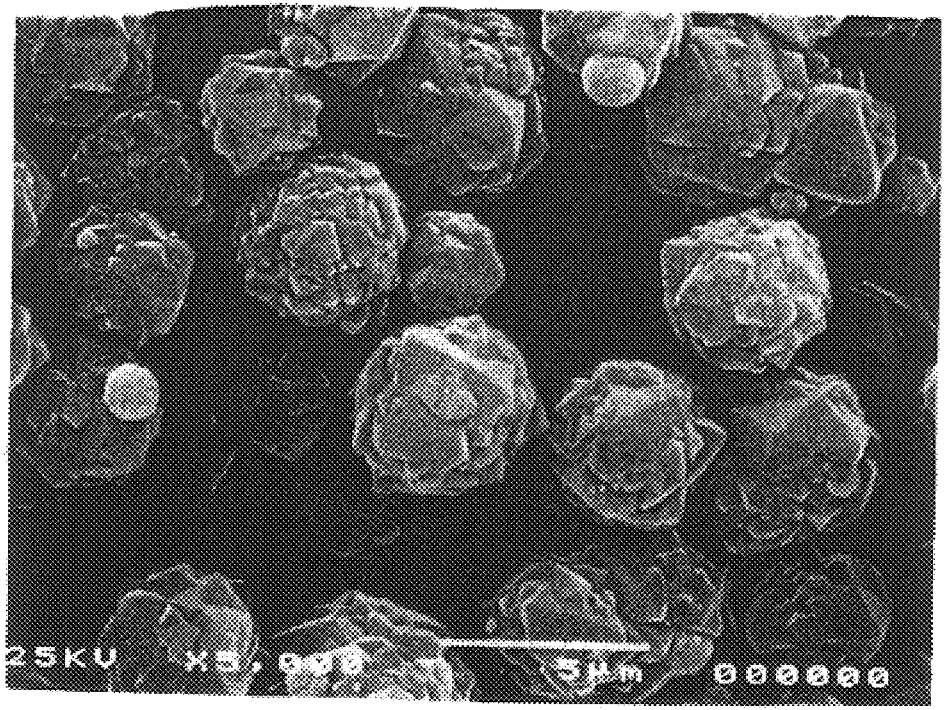
FIG. 3 is a photograph of the crystal structure of the powder obtained in Comparative Example 2, as observed by SEM under 5,000 magnifications.

When zeolite is observed by SEM, it is present in the form of primary particles only, which are the smallest units of zeolite particles, or in the form of secondary particles which are formed by agglomeration of a plurality of primary particles. Usually, primary particles of zeolite have their shapes predetermined depending upon the type. For example, A-type zeolite has a cubic shape, and faujasite-type zeolite has an octagonal shape or a polygonal shape having a generally spherical shape with some angularity developed as shown by FIG. 3.

Usually, particle sizes of these particles have a distribution about a certain value at its center. A method for obtaining an average particle size from particles having a distribution, is described in detail, for example, at pages 1 to 31 in "Powder Engineering Theory", edited by Shigeo Miwa, published in 1981 by Nikkan Kogyo Shinbun K.K. The primary particle size in the present invention is a number average particle size of the diameters when the primary particles of the faujasite type zeolite observed by SEM are approximated to spheres which are called "projected area diameter" or "Heywood diameter".

LSX in the present invention is not only of high purity but characterized in its fine primary particle size. LSX in the present invention has a primary particle size of at least 0.05 $\mu$m and less than 1 $\mu$m, which is a fine primary particle size which has not heretofore been known. The primary particle size of LSX which has been known, is from 3 to 5 $\mu$m, and even small one has had a particle size of at least 1 $\mu$m. When fine LSX of high purity of the present invention, is used, for example, as an adsorbent of various substances, diffusion into the interior will be facilitated, and improvement in various dynamic properties can be expected.

The present invention also provides a process for producing a fine low silica faujasite type zeolite of high purity having a $SiO_2/Al_2O_3$ molar ratio of from 1.9 to 2.1, which comprises mixing and gelling a solution containing an aluminate and a solution containing a silicate, followed by aging and crystallization, wherein after the gelation and/or at the initial stage of the aging, a solution having a composition of 10–20 $Na_2O$. $Al_2O_3$.5–20 $SiO_2$.100–250 $H_2O$ and pre temperature of from 10 to 60° C. for from 10 minutes to 3 hours, is added in an amount of from 0.03 to 10% as $Al_2O_3$ to the low silica faujasite type zeolite to be formed.

As the process for producing LSX by mixing and geling a solution containing an aluminate and a solution containing a silicate, followed by aging and crystallization, in the present invention, it is preferred to employ a process wherein a solution containing ions of sodium, potassium, an aluminate and a silicate, is aged while maintaining the viscosity after initiation of gelation at a level of from 10 to 10,000 cp, followed by crystallization, or a process wherein a solution containing an aluminate and a solution containing a silicate are mixed and geled at a temperature of from 20 to 60° C. to prepare a slurry having a viscosity of from 10 to 10,000 cp after initiation of gelation, followed by aging and then crystallization, because other than such a process, it will be difficult to prepare LSX industrially advantageously under a condition where it is easy to increase the scale.

The present inventors have found surprisingly that when a solution having a composition of 10–20 $Na_2O.Al_2O_3$.5–20 $SiO_2$.100–250 $H_2O$ and preliminarily aged at a temperature of from 10 to 60° C. for from 10 minutes to 3 hours, is added after the gelation or at the initial stage of the aging in the above described process, it is possible to prepare fine LSX of high purity which has not heretofore been known, and LSX can be formed in an extremely short period of aging time. The present invention has been accomplished on the basis of this discovery.

In the present invention, the solution having a composition of 10–20 $Na_2O.Al_2O_3$.5–20 $SiO_2$.100–250 $H_2O$ will be referred to simply as "the solution to be added".

The composition of "the solution to be added" is required to be within a range of 10–20 $Na_2O.Al_2O_3$.5–20 $SiO_2$.100–250 $H_2O$. If the composition of the solution to be added is outside this range, a long period of aging time will be required for preparation of fine LSX of high purity, such being undesirable, and further, it is possible that impurities are likely to form.

It is necessary that "the solution to be added" is preliminarily subjected to aging at a temperature of from 10 to 60° C. for from 10 minutes to 3 hours. It is considered that in the solution to be added, subjected to aging, crystallites of fine X-type zeolite having a $SiO_2/Al_2O_3$ molar ratio of about 2.4, are formed, as disclosed in Proc. 7th Int Conf. Zeolites, p.185–192, 1986. Although the mechanism is not clearly understood in the present invention, such crystallites of fine X-type zeolite contained in "the solution to be added" are believed to perform some action, which has made it possible to prepare fine LSX of high purity in a short period of aging time.

With respect to the timing for the addition of "the solution to be added", it is most preferred to add it after termination of the gelation, i.e., upon completion of the mixing of the solution containing an aluminate and a solution containing a silicate. However, there is no problem in a certain delay in the addition, and the solution to be added, may be added after completion of the gelation or at the initial stage of the aging step when the formed gel is aged. By adding the solution at such a time, it is possible to prepare fine LSX of high purity in a short period of aging time.

Further, the present inventors have made a detailed study on the amount of "the solution to be added" and as a result, have surprisingly found that the effects are obtainable from a very small amount. Namely, when the amount of "the solution to be added" is at least 0.03% as $Al_2O_3$ to the low silica faujasite type zeolite to be formed, it is possible to prepare fine LSX of high purity in a short period of aging time. If the amount of the solution to be added is large, the particle size tends to be small under the same aging condition, and it is possible to shorten the aging time to obtain the same particle size. However, if the amount of "the solution to be added" exceeds 10.0% as $Al_2O_3$ to the low silica faujasite type zeolite to be formed, a large installation will be required for industrial production of LSX. Such is not only practically disadvantageous, but is likely to bring about a possibility that the composition of resulting LSX will not have a $SiO_2/Al_2O_3$ molar ratio of from 1.9 to 2.1, such being undesirable.

This "solution to be added" has a very strong action for accelerating formation of LSX, and if the amount of "the solution to be added" is at least 0.001% and less than 0.03%, LSX having a conventional particle size of at least 1 μm can be prepared in high purity in a short period of aging time.

After adding "the solution to be added", aging is carried out. The aging may be carried out in a stand still state or in a stirred state. However, in order to obtain fine LSX of high purity in a short period of aging time, it is necessary to carry out the aging in a stirred state. When the aging is carried out in a stand still state, in order to obtain fine LSX of high purity, a long period of aging time will be required. It used to be considered necessary to carry out the aging and crystallization in a state of standing still or in a state close to standing still. Whereas, in the present invention, as opposed to such conventional knowledge, the more intensive the stirring during the aging is, the more readily the fine LSX of high purity tends to form, whereby it becomes possible to obtain LSX in a short period of aging time, which used to be believed to be impossible by the prior art. In the present invention, the stirring during the aging can be carried out usually by means of a propeller, a turbine, or stirring vanes such as paddles. The more intensive the stirring, the better, and it is not desirable that a stagnant portion of the slurry remains in the reactor. The specific intensity of the stirring can be expressed by means of "power required for stirring per unit volume of a slurry: unit $kW/m^3$" as defined in chemical engineering, and the intensity of the stirring is required to be at least 0.1 $kW/m^3$, preferably at least 0.2 $kW/m^3$, more preferably at least 0.4 $kW/m^3$, still more preferably at least 0.8 $kW/m^3$ which is called intensive stirring in chemical engineering. The more intensive the stirring, the better, but in order to carry out the stirring intensively, a correspondingly powerful motor is required. Accordingly, for example, an industrially feasible level of 3.0 $kW/m^3$ may be mentioned as the upper limit of the power required for stirring per unit volume of a slurry.

The aging time in the present invention can not generally be defined, since it varies depending upon the amount of "the solution to be added", the temperature during the aging, the intensity of stirring, etc. However, in view of the purpose of the present invention to provide a process for producing fine LSX of high purity in a short period of time, a long period of aging time is meaningless, and accordingly, the aging time is preferably not longer than 24 hours, more preferably not longer than 15 hours, particularly preferably not longer than 12 hours.

Surprisingly, when the present invention is employed, depending on the amount of the solution to be added, the aging temperature and the stirring intensity, it becomes possible to prepare fine LSX of high purity even in a short period of aging time i.e. from 0.5 to 10 hours, within which it used to be considered impossible to obtain LSX of high purity in the conventional method for preparation of LSX. Then, the slurry aged for a predetermined period of time is heated to the temperature for crystallization. LSX will readily form from the slurry aged by the method of the present invention, and the temperature raising can be carried out by any method so long as it is a commonly known method. In the laboratory, a water bath containing the reactor may be heated while continuing the stirring, or the temperature raising may be carried out by putting the reactor in a dryer maintained at a predetermined temperature. In a plant, a conventional operation known in chemical engineering, such as, a method of raising the temperature by circulating steam or a heating medium in a heat exchanger such as a jacket, attached to the reactor, may be carried out, while continuing the stirring to facilitate the thermal conduction. Further, the time required for the temperature raising is not particularly limited, and it may, for example, be from 0.5 to 5 hours.

Fine LSX of high purity readily forms from the slurry aged by the method of the present invention. It is not essential to carry out the crystallization under a stand still condition which used to be essential. Namely, the crystallization may be carried out with stirring or in a stand still condition. The temperature for the crystallization may be the crystallization temperature of LSX which is commonly known heretofore, and it may, for example, be a temperature of from 60 to 100° C. Further, the crystallization time can not be generally defined as it varies depending upon the aging conditions, the composition and the crystallization temperature. However, it is usually from 2 to 12 hours, and may be longer.

Fine low silica faujasite type zeolite of high purity having a $SiO_2/Al_2O_3$ molar ratio of from 1.9 to 2.1, prepared as described above, will be filtered, washed and dried. Conventional methods may be employed for the filtration, washing and drying.

LSX obtained by the process of the present invention may be molded into, e.g., spherical or columnar pellets by means of a clay binder or the like and then subjected to ion exchange with Li ions or Ca ions and activated, for example, at 400° C. for about 1 hour, to obtain an adsorbent separator having a high adsorption performance, and such an adsorbent separator is excellent in the gas adsorption performance, particularly nitrogen adsorption performance, and thus is useful as a zeolite adsorbent separator to separate and concentrate oxygen from a gas mixture of oxygen and nitrogen by an adsorption method.

Now, the present invention will be described in further detail with reference to Examples. However, it should be understood that the present invention is by no means restricted to such specific Examples.

In the Examples, the following measuring methods were used.

(1) Method for Measuring the Chemical Composition

A sample was dissolved by means of nitric acid and hydrofluoric acid, whereupon Na, K, Al and Si were measured by means of an ICP emission analyzer (Model Optima 3000, manufactured by PERKIN Elmer Company), and they were, respectively, calculated as $Na_2O$, $K_2O$, $Al_2O_3$ and $SiO_2$.

(2) Method for Measuring the Crystal Structure

Measured by means of an X-ray diffraction apparatus (Model MXP-3, manufactured by Mac Science Company).

(3) Method for Observing the Particles

Measured by means of a scanning electron microscope (Model JSM-T220A, manufactured by Nippon Denshi K.K.).

(4) Method for measuring the equilibrium adsorption of water.

A powder dried at 100° C. was left to stand in a desiccater having a relative humidity of 80% for at least 16 hours, whereupon the measurement was made by intensively heating it at 900° C. for one hour. Namely, the equilibrium adsorption of water (%) was obtained from the following formula, where X1 is the weight after adsorption of water, X2 is the weight after intensive heating at 900° C. for one hour:

Equilibrium absorption of water (%)={(X1−X2)/X2}×100.

(5) Method for ion exchange into Na-form LSX

The ion exchange was carried out by the method disclosed in ZEOLITES, vol 7, September, p.456 (1987). A 1 mol/L sodium chloride aqueous solution adjusted to pH 12 by an addition of sodium hydroxide, was added so that sodium chloride would be 1 mol per mol of LSX, and ion exchange was carried out in a batch system at room temperature. This operation was repeated five times.

EXAMPLE 1

Preparation of "the solution to be added"

Into a polyethylene reactor having an internal capacity of 0.5l, 36 g of an aqueous sodium aluminate solution ($Na_2O$=20.0 wt %, $Al_2O_3$=22.5 wt %), 66 g of sodium hydroxide (purity: 99%) and 120 g of pure water were added, stirred and dissolved, and the solution was maintained at 40° C. by means of a water bath. To this solution, 166 g of a No. 3 sodium silicate aqueous solution ($Na_2O$=9.3 wt %, $SiO_2$=28.9 wt %) was added, and aging was carried out at 40° C. for 60 minutes. The composition of "the solution to be added" at that time was 15.0 $Na_2O.Al_2O_3$.10.0 $SiO_2$.180 $H_2O$.

Preparation of LSX

Into a stainless steel reactor having an internal capacity of 3l, 896 g of an aqueous sodium silicate solution ($Na_2O$=3.8 wt %, $SiO_2$=12.6 wt %), 777 g of water, 231 g of sodium hydroxide (purity: 99%) and 455 g of an industrial potassium hydroxide aqueous solution (purity: 48%) were introduced and maintained at 40° C. by means of a water bath, while stirring at 250 rpm. To this solution, 462 g of an aqueous sodium aluminate solution ($Na_2O$=20.0 wt %, $Al_2O_3$=22.5 wt %) maintained at 40° C. was added over one minute. Immediately after the addition, turbidity and gelation started. Immediately before completion of the addition, the viscosity of the entire gel increased, and partial stagnation of gel started at the upper portion of the reactor, but about 1 minute later, the entire slurry was fluidized uniformly. When the entire slurry became fluidized uniformly, 25 g of the above described "the solution to be added" was added. The amount of "the solution to be added" at that time was 0.5 wt % as $Al_2O_3$ to LSX to be formed. Stirring was continued at 250 rpm to carry out aging at 40° C. for 4 hours. After the aging, while continuing the stirring, the temperature was raised to 70° C. over one hour. After raising the temperature, stirring was stopped, and crystallization was carried out at 70° C. for 4 hours. The obtained crystals were collected by filtration, thoroughly washed with pure water and then dried at 70° C. overnight.

The structure of the crystal powder obtained was a faujasite type zeolite single phase as a result of the X-ray diffractometry. Further, as a result of the analysis of the composition, the chemical composition of this powder was 0.71 $Na_2O.0.29$ $K_2O.Al_2O_3.2.0$ $SiO_2$, and the equilibrium adsorption of water was 34.2%. The obtained powder was observed by SEM, whereby it was fine LSX having a primary particle size of 0.2 μm. Further, it was ion exchanged to Na-form, and the water adsorption was obtained and found to be 37.0%.

EXAMPLE 2

Preparation of LSX

Into a stainless steel reactor having an internal capacity of 3l, 917 g of an aqueous sodium silicate solution ($Na_2O$=3.8 wt %, $SiO_2$=12.6 wt %), 749 g of water, 231 g of sodium hydroxide (purity: 99%) and 446 g of an industrial potassium hydroxide aqueous solution (purity: 48%) were introduced and maintained at 40° C. by means of a water bath, while stirring at 250 rpm. To this solution, 458 g of an aqueous sodium aluminate solution ($Na_2O$=20.0 wt %, $Al_2O_3$=22.5 wt %) maintained at 40° C., was added over one minute. Turbidity and gelation started immediately after the addition. Immediately before completion of the addition, the viscosity of the entire gel increased, and partial stagnation of the gel started at an upper portion of the reactor, but about one minute later, the entire slurry was fluidized uniformly. When the entire slurry became fluidized uniformly, 5 g of "the solution to be added" prepared in the same manner as in Example 1, was added. The amount of "the solution to be added" at that time was 0.1 wt % as $Al_2O_3$ to LSX to be formed. Stirring was continued at 250 rpm to carry out aging at 40° C. for 4 hours. After the aging, the temperature was raised to 70° C. over one hour, while continuing stirring. After raising the temperature, stirring was stopped, and crystallization was carried out at 70° C. for 4 hours. The obtained crystals were collected by filtration and thoroughly washed with pure water and then dried at 70° C. overnight.

The structure of the obtained crystal powder was a faujasite type zeolite single phase as a result of the X-ray diffractometry. Further, as a result of the analysis of the composition, the chemical composition of the powder was 0.71 $Na_2O.0.2$ $K_2O.Al_2O_3$ .2.0 $SiO_2$, and the equilibrium adsorption of water was 33.8%. The obtained powder was observed by SEM, whereby it was fine LSX having a primary particle size of 0.4 μm. Further, it was ion exchanged to Na-form, and the water adsorption was obtained and found to be 36.7%.

Comparative Example 1

The same operation as in Example 2 was carried out except that "the solution to be added" was not added.

The structure of the obtained crystal powder was mainly a faujasite type zeolite as a result of the X-ray diffractometry, and trace amounts of A-type zeolite, F-type zeolite, E-type zeolite and a non-identifiable phase, were observed. Further, as a result of the analysis of the composition, the chemical composition of the powder was 0.73 $Na_2O.0.27$ $K_2O.Al_2O_3.2.0$ $SiO_2$, and the equilibrium adsorption of water was 32.6%. The obtained powder was observed by SEM, whereby in addition to LSX having a primary particle size of about 10 μm, an impurity phase was substantially observed. Further, it was ion exchanged to Na-form, and the water adsorption was obtained and found to be 34.9%.

Comparative Example 2

The same operation as in Comparative Example 1 was carried out except that the aging time was changed to 24 hours.

The structure of the obtained crystal powder was a faujasite type zeolite single phase as a result of the X-ray diffractometry. The chemical composition of the powder was 0.73 $Na_2O.0.27$ $K_2O.Al_2O_3.2.0$ $SiO_2$, and the equilibrium adsorption of water was 33.3%. The obtained powder was observed by SEM, whereby an impurity phase was slightly observed, and the product was large LSX having a primary particle size of about 5 μm. Further, it was ion exchanged to Na-form and the water adsorption was obtained and found to be 35.8%.

As shown in Comparative Examples 1 and 2, even by a method other than the present invention, it is possible to obtain LSX of high purity, but a long period of time of aging is required, thus being poor in the productivity, and obtained LSX is also different from the one obtained by the present invention.

According to the present invention, fine LSX of high purity can be presented, and the time for the aging step which used to require a long period of time during the reaction process, can be shortened. Accordingly, fine LSX of high purity can be produced on a large scale in a short period of time. Thus, the process of the present invention is an industrially useful process.

What is claimed is:

1. A fine low silica faujasite type zeolite of high purity, having a faujasite single phase as measured by X-ray diffractometry, wherein the $SiO_2/Al_2O_3$ molar ratio is from 1.9 to 2.1, the water adsorption in the form of Na-type is at least 35.0%, and the primary particle size is at least 0.05 $\mu$m and less than 1.0 $\mu$m.

2. A process for producing a low silica faujasite type zeolite having a $SiO_2/Al_2O_3$ molar ratio of from 1.9 to 2.1, which comprises mixing and geling a solution containing an aluminate and a solution containing a silicate, followed by aging and crystallization, wherein after the gelation and/or at the initial stage of the aging, a solution having a composition of 10–20 $Na_2O$. $Al_2O_3$.5–20 $SiO_2$.100–250 $H_2O$ and preliminarily aged at a temperature of from 10 to 60° C. for from 10 minutes to 3 hours, is added in an amount of from 0.03 to 10% as $Al_2O_3$ to the low silica faujasite type zeolite to be formed.

3. The process for producing a low silica faujasite zeolite according to claim 2, wherein stirring is carried out during the aging.

* * * * *